United States Patent
Welin et al.

(10) Patent No.: US 9,654,370 B2
(45) Date of Patent: May 16, 2017

(54) METHOD AND NODE ARRANGEMENT FOR PROVIDING MORE ACCURATE ESTIMATION OF DATA PATH CONDITIONS

(71) Applicant: TELEFONAKTIEBOLAGET L M ERICSSON (PUBL), Stockholm (SE)

(72) Inventors: Annikki Welin, Solna (SE); Tomas Thyni, Järfälla (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 44 days.

(21) Appl. No.: 14/653,168

(22) PCT Filed: Dec. 21, 2012

(86) PCT No.: PCT/SE2012/051494
§ 371 (c)(1),
(2) Date: Jun. 17, 2015

(87) PCT Pub. No.: WO2014/098694
PCT Pub. Date: Jun. 26, 2014

(65) Prior Publication Data
US 2015/0333993 A1     Nov. 19, 2015

(51) Int. Cl.
*H04L 12/26*     (2006.01)
*H04W 24/08*     (2009.01)

(52) U.S. Cl.
CPC .......... *H04L 43/0882* (2013.01); *H04L 43/10* (2013.01); *H04L 43/103* (2013.01); *H04L 43/12* (2013.01); *H04W 24/08* (2013.01)

(58) Field of Classification Search
None
See application file for complete search history.

(56) References Cited

U.S. PATENT DOCUMENTS

| 7,778,179 B2 | 8/2010 | Ekelin et al. |
| 2007/0115849 A1 | 5/2007 | Ekelin |

(Continued)

FOREIGN PATENT DOCUMENTS

| EP | 1981220 A1 | 10/2008 |
| WO | 2009118602 A2 | 10/2009 |

(Continued)

OTHER PUBLICATIONS

Constantine, IP Performance Metrics WG (ippm), Mar. 2011, pp. 1-7.*

(Continued)

*Primary Examiner* — Nicholas Sloms

(57) ABSTRACT

The present invention relates to a method and node arrangement for evaluating available conditions of a data path between a sending node and a destination node in a data communications network by means of an active measurement process comprising one or more measurement sessions. The data path and sending node comprises a sending node interface. The method involves performing a measurement session of said data path for determining a measurement result, and estimating one or more available conditions of a data path using the measurement result and one or more initial parameter values as input in a calculation algorithm. The method further comprises setting one initial parameter value for the calculation to a maximum bandwidth capacity based on the lowest bandwidth capacity value of the interfaces of both nodes sending said probe packet sequences during said measurement session.

14 Claims, 10 Drawing Sheets

(56) References Cited

U.S. PATENT DOCUMENTS

| | | | | |
|---|---|---|---|---|
| 2009/0238200 A1* | 9/2009 | Melsen | ............... | H04L 12/5695 370/431 |
| 2012/0087235 A1* | 4/2012 | Smith | ................. | H04L 41/0677 370/221 |
| 2012/0128000 A1 | 5/2012 | Baillargeon et al. | | |
| 2014/0029441 A1* | 1/2014 | Nydell | ................. | H04L 43/0864 370/241.1 |

FOREIGN PATENT DOCUMENTS

| | | |
|---|---|---|
| WO | 2011112126 A1 | 9/2011 |
| WO | 2012066371 A1 | 5/2012 |

OTHER PUBLICATIONS

Ekelin, S., et al., Real-Time Measurement of End-to-End Available Bandwidth using Kalman Filtering,' Ericsson Research, Stockholm Sweden, May 2006.

Baillargeon, S., et al., "TWAMP Value-Added Octets draft-ietf-ippm-twanrip-value-added-octets-01.txt," Network Working Group, INTERNET-DRAFT, Intended Status: Informational, Mar. 26, 2012.

Ekelin, S., et al., Real-Time Measurement of End-to-End Available Bandwidth using Kalman Filtering,' Ericsson Research, Stockholm Sweden.

Hedayat, K., et al., "A Two-Way Active Measurement Protocol (TWAMP)," Network Working Group, Request for Comments: 5357, Oct. 2008.

Morton, A., et al., "Two-Way Active Measurement Protocol (TWAMP) Reflect Octets and Symmetrical Size Features," Internet Engineering Task Force (IETF), Request for Comments: 6038, Oct. 2010.

Ribeiro, et al., pathChirp: Efficient Available Bandwidth Estimation for Network Paths, Passive and Active Measurement Workshop, 2003.

Jain, et al., Pathload: a measurement tool for end-to-end available bandwidth, Passive and Active Measurement (PAM) Workshop 2002 Proceedings, Mar. 2002.

Strauss, et al., A Measurement Study of Available Bandwidth Estimation Tools, Proceedings of the ACM SIGCOMM Internet Measurement Workshop, 2003.

* cited by examiner

METHOD AND NODE ARRANGEMENT FOR PROVIDING MORE ACCURATE ESTIMATION OF DATA PATH CONDITIONS

This application is a 371 of PCT/SE2012/051494, filed Dec. 21, 2012, the disclosure of which is fully incorporated herein by reference.

TECHNICAL FIELD

This disclosure relates to active measurement methods in data communication networks.

BACKGROUND

A packet switched data network such as the Internet can be considered to comprise a mass of nodes interconnected by data paths.

In packet switched data networks, monitoring a data path, or in other words, estimating a condition such as available bandwidth end-to-end over a data path of the network is useful in several contexts; including Service Level Agreement (SLA) verification, network monitoring and server selection.

Mainly, there are two ways to estimate a condition such as available bandwidth, namely passive or active monitoring.

Passive monitoring of available bandwidth of an end-to-end data path requires that all of the network nodes in the network path can be accessed, However, this is typically not possible. Therefore, measuring available end-to-end bandwidth is typically done by active probing of the data path. The available bandwidth can be estimated by transmitting probe traffic, such as User Data Protocol (UDP) probe packets including a train of probe packets into the data path, and then analyzing the observed effects of other data packet communications, here denoted, cross traffic on the probe packets. Typically, large UDP probe packets having a specified inter-packet separation are transmitted. This kind of active measurement requires access to both sender and receiver hosts, referred to as sender and receiver nodes, but does not require access to any intermediate node(s) in the path between the sender and receiver nodes. Conventional approaches to active probing require the transmission of probe packet traffic into the data path of interest at a rate that is sufficient transiently to use all available bandwidth and cause congestion. If only a small number of probe packets are used, then the induced transient congestion can be absorbed by buffer queues in the nodes. Accordingly, no data packet loss is caused, but rather only a small data path delay increase of a few data packets. The desired measure of the available bandwidth is determined based on the increase in delay due to the probe packets having experienced congestion between sender and receiver node. The probe packet rate where the data path delay begins increasing corresponds to the point of congestion, and thus is indicative of the available bandwidth. The estimation is typically produced by means of an analysis algorithm based on probe rate methods and are known per se. Examples of such algorithms that could be employed are: Bandwidth Available in Real Time (BART) presented in reference [1], pathChirp presented in reference [2], Pathload presented in reference [3] or Spruce presented in reference [4]. These are also described in a number of other prior art documents, such as U.S. Pat. No. 7,778,179 B2 (Ekelin et al) describing BART.

The current methods give an estimate of e.g. the available bandwidth for the whole network path between the sender and the receiver.

One problem with the existing active measurement methods is the time it takes to present the bandwidth estimate.

Further one problem is that the measured bandwidth estimate can give a higher capacity value than the capacity actual available.

Even with the Kalman filter the estimated bandwidth is showing bigger bandwidth than available, creating uncertainness to the measurements. This problem is discussed in ref. [1].

SUMMARY

One object of this disclosure is to provide a method for providing more accurate estimations of data path conditions. Further, one object is to decrease the time to achieve the more accurate result of the performed measurement.

According to one aspect, embodiments of a method for evaluating available conditions of a data path between two end nodes in a data communications network by means of an active measurement process are provided. Said active measurement process comprises one or more measurement sessions. In a session one of the end nodes is sending probe packet sequences and the other node is receiving said probe packet sequences. The probe packet sending node comprises an interface having one upstream maximum bandwidth capacity and one downstream maximum bandwidth capacity. The method involves performing a measurement session of said data path for determining a measurement result and estimating one or more available conditions of a data path using the measurement result and one or more initial parameter values as input in a calculation algorithm. The method further comprises to set one initial parameter value for the calculation to a maximum bandwidth capacity based on the lowest bandwidth capacity value of the interfaces of both nodes sending said probe packet sequences during said measurement session.

According to another aspect, this disclosure provides embodiments of a node arrangement for evaluating available conditions of a data path between two end nodes in a data communications network by means of an active measurement process. Said active measurement process comprises one or more measurement sessions. In a measurement session one of the end nodes is sending probe packet sequences and the other node is receiving said probe packet sequences. The probe packet sending node comprises an interface having one upstream maximum bandwidth capacity and one downstream maximum bandwidth capacity. The arrangement comprises measurement means configured to perform a measurement session of said data path for determining a measurement result, and an evaluating device for estimating one or more available conditions of a data path using the measurement result and one or more initial parameter values as input in a calculation algorithm. The arrangement further comprises setting means configured to set one initial parameter value for the calculation to a maximum bandwidth capacity based on the lowest bandwidth capacity value of the interfaces of both nodes sending said probe packet sequences during said measurement session.

One advantage of the method and node arrangement is that by setting one initial parameter value for the calculation to a maximum bandwidth capacity based on the lowest bandwidth capacity value of the interface of the node sending said probe packet sequences during said measurement session a more accurate estimation value of an available condition, e.g. available bandwidth, of the measured data path is achieved in comparison to other initial parameter values.

BRIEF DESCRIPTION OF THE DRAWINGS

The foregoing, and other, objects, features and advantages of the present invention will be more readily understood upon reading the following detailed description in conjunction with the drawings in which.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well known methods, devices, and circuits are omitted so as not to obscure the description of the present invention with unnecessary detail.

The following description of the exemplary embodiments refers to the accompanying drawings. The same reference numbers in different drawings identify the same or similar elements. The following detailed description does not limit the invention. Instead, the scope of the invention is defined by the appended claims.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

As mentioned above, a number of different active measurement methods and analysis algorithms based on probe rate methods and are known. Examples of such algorithms are: Bandwidth Available in Real Time (BART) presented in reference [1], pathChirp presented in reference [2], Pathload presented in reference [3] or Spruce presented in reference [4]. These are also described in a number of other prior art documents, such as U.S. Pat. No. 7,778,179 B2 (Ekelin et al) describing BART.

Active measurement will now be described with reference to FIGS. 1, 2, 3 and 4

Figure 1:
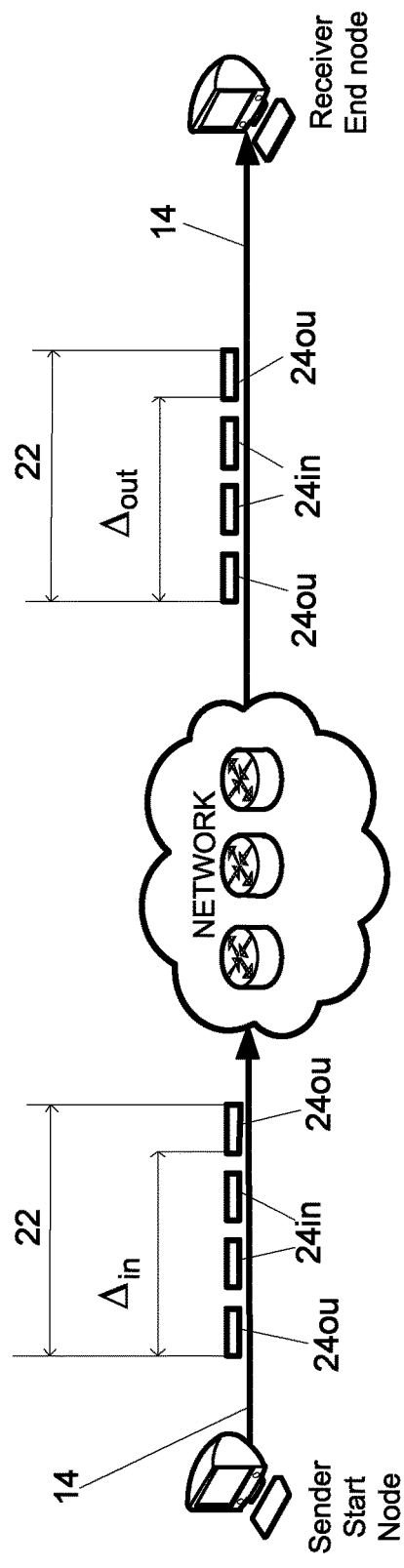
FIG. 1 is a block diagram illustrating a data path and sub-paths thereof.

FIG. 1 is illustrating a data path 14. Thus, said data path 14 comprises a number of links connecting said start node $R_0$ with the end node $R_N$ via a number of intermediate nodes ($R_1, \ldots, R_{N-1}$), each node is constituting a node hop, even denoted router hop or hop. Each link is having an available bandwidth $B_{link}$ during operation of said network.

The concept of self-induced congestion is to inject probe packets at a specified rate at one endpoint and then observe the changes in the rate at another endpoint. By analyzing probe traffic being transferred from one node to another node, the available bandwidth may be estimated.

Figure 2:
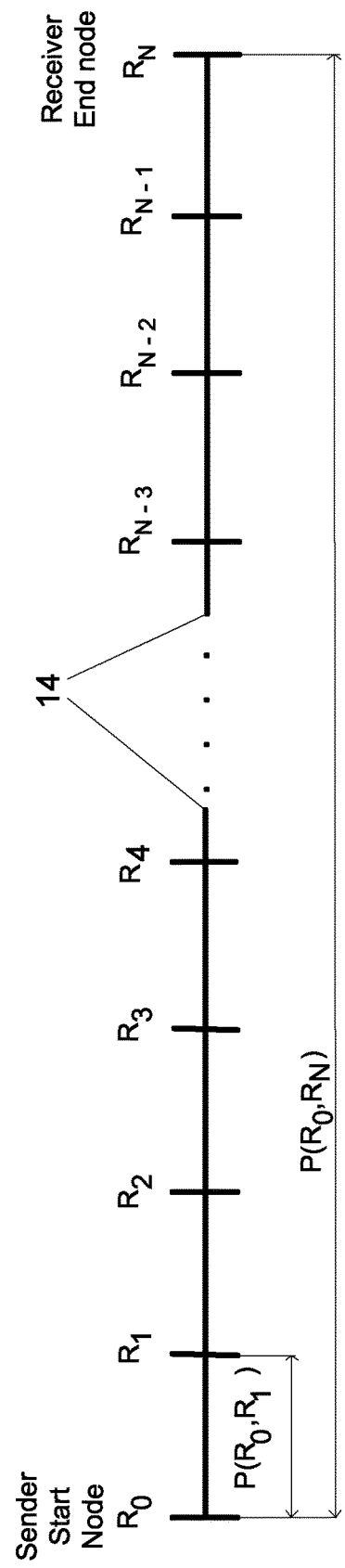
FIG. 2 is a block diagram of an exemplary network in which arrangements and methods described herein may be implemented.

The so called probing is illustrated in FIG. 2. The start node $R_0$ is denoted sending node and the end node $R_N$ is receiving node. The data path comprises a sending node interface, e.g. the link illustrated as $P(R_0,R_1)$. A probe packet train 22 is sent with an initial probe bit rate $u_1$. In this example, the probe packet train involves four data packets 24, two outer packets 24ou, first and last in the train, and between the outer packets two inner packets 24in. Of course, a train may comprise more than two inner packets. If the probe packet train size is s [bits] and the time dispersion is $\Delta$in [time unit; s], herein also denoted inter-packet separation IPSsent [time unit; s], said parameters have the following relation $$u_1 = s/\Delta in$$

If probe rate is higher than the available bandwidth B in any of the links of the data path the packets will congest the at least one link in the path momentarily and thereby they will on average be received at a reduced rate u2. This is equivalent to that the time dispersion at the sender side, $\Delta$in, is smaller than the time dispersion at the receiver, $\Delta$out. Thus, $$u_2 = s/\Delta out$$

if no packet loss has occurred during the transfer.

It is possible to define the ratio inter-packet strain $$\epsilon = (\Delta out - \Delta in)/\Delta in$$

On the other hand, if the probe rate is lower than the available bandwidth, there is no congestion and so on average no extended time dispersion, that is $\epsilon=0$.

BART and pathChirp are two examples of methods utilizing self-induced congestion that also are capable of providing available bandwidth estimates in real time. By sending probe packets between two endpoints the end-to-end available bandwidth is estimated by means of various statistical methods where $\Delta$out is compared to $\Delta$in.

Defining Available Bandwidth

Figure 3:
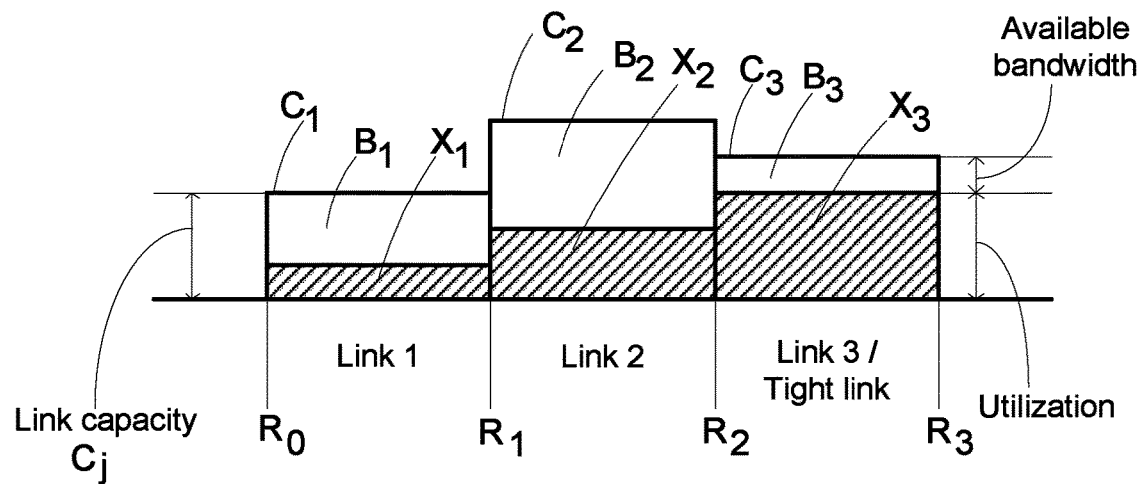
FIG. 3 is a diagram for illustrating the concepts of the performance parameters capacity, utilization and available bandwidth.

FIG. 3 is a diagram for illustrating the concepts of the performance parameters capacity, utilization and available bandwidth.

A sub-path $P(R_0,R_3)$ involving three links that are part of the network path illustrated in FIG. 2 will now be discussed. Each link has a constant capacity that defines the maximum rate at which IP traffic can be sent. At any given point in time the links are utilized to some degree by IP traffic, this is exemplified by the shaded area in each box. Then, for each link the available bandwidth is calculated as the difference between the link capacity and the utilization.

By means of an analyze algorithm, e.g. BART, the available bandwidth of the link with the least available bandwidth of the data path is estimated. This defines the path available bandwidth. Further, with BART it is possible to estimate the tight link capacity which is the capacity of the link defining the path available bandwidth. The path available bandwidth and tight link capacity is illustrated as Link 3 in the figure.

As already discussed briefly, in some embodiments of the invention, for example, the condition to be estimated is the available bandwidth of the network path. The concept of available bandwidth can be understood as follows. Each link j in a network path has a certain capacity, $C_j$, determined by the network interfaces in the nodes on each end of the link. The capacity $C_j$ is simply the highest possible bit rate over the link at the packet level. The capacity typically does not vary over short time scales. However, the load, even denoted utilization or cross traffic, on a given link j, denoted by $X_j(t)$, does vary. The available bandwidth $B_j(t)$ of link j is $B_j(t)=C_j-X_j(t)$. One of links j along the path has the smallest available bandwidth. This "bottleneck link" determines the available bandwidth of the path. The available bandwidth $B(t)$ of a network path is the minimum of the available bandwidths respectively associated with its constituent links:

$$B(t)=\min(C_j-X_jt)).$$

The available bandwidth of a network path at any time t can thus be interpreted as the maximum increase in data rate, from sending end to receiving end, which can theoretically occur at time t without causing congestion. It should be noted that cross traffic load and thus available bandwidth are defined using some averaging time scale T, i.e. $X_j(t)$ is calculated by averaging over some time interval of length T around time t. There is no universal, natural choice of T, rather this depends on the specifics of the application. Due to finite link capacity and cross-traffic packet size, T may not be chosen arbitrarily small. However, for modern data networks, available bandwidth and cross traffic load could be defined using T as low as in the sub-second region.

Relation Inter-Packet Strain and Probe Rate

Figure 4:
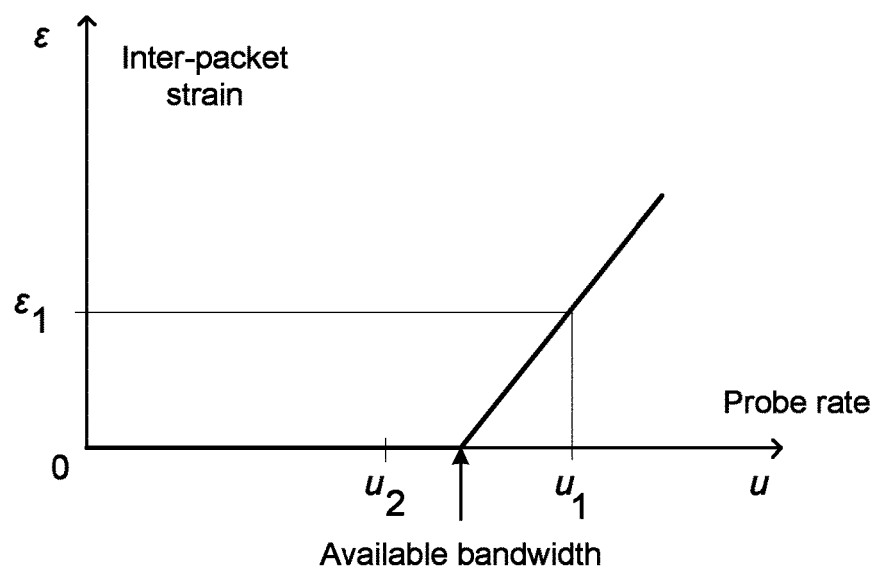
FIG. 4 is a diagram illustrating the asymptotic relation between available bandwidth B, probe intensity u and expectation value of inter-packet strain $\epsilon$.

FIG. 4 is a diagram illustrating the asymptotic relation between available bandwidth B, probe rate u and expectation value of inter-packet strain $\epsilon$.

In the following, a model of a network path from a sender to a receiver will be described. The network path is considered to consist of a number of a succession of concatenated hops. A hop consists of an input queue and a transmission link. The queues are assumed to be First-in First-out, FIFO, queues. Each hop j has a capacity $C_j$ and carries a time-varying cross traffic $X_j$. Of special interest is the interactions between the regular traffic cross traffic $X_j$ and the injected probe traffic u in order to arrive at a formalism which allows analyzing the effect that cross traffic $X_j$.

First, consider a single hop with link capacity C and cross traffic X. The available bandwidth is then C-X. Assume that the link is also subject to probe traffic demand at a rate u. If $u \leq C-X$ there is no congestion and the received probe traffic rate r exiting the link is the same as the demand probe rate u. However, in the case $u>C-X$, an overload situation is present. It is assumed that the cross traffic and the probe traffic each receive their proportionate share of the link capacity C.

The received probe traffic rate may be described as:

$$r = \frac{u}{u+X}C$$

Expressed as a first-order polynomial:

$$\frac{u}{r} = \frac{1}{C}u + \frac{X}{C}$$

$$\frac{u}{r} = \begin{cases} 1 & (u \leq C-X) \\ \frac{1}{C}u + \frac{X}{C} & (u > C-X) \end{cases}$$

Thus, by varying u and trying to identify the point where u/r starts to deviate from unity, a way of estimating the available bandwidth of the link. By repeating this argument for several concatenated links, the available bandwidth for the entire path from sender to receiver can be estimated by studying the ratio of offered probe rate at the sender to received probe rate at the receiver, and determining the point where this ratio starts deviating from unity. This value of u is the estimate of the available bandwidth B of the entire path.

Note that when one estimates the parameters of the straight line, one simultaneously also gets an estimate of the bottleneck link C, as this is the inverse of the slope.

Now, considering the discrete (packet-oriented) nature of network traffic, it is necessary to adapt the above reasoning to take into account the fact that the traffic is not a continuous flow, but is composed of discrete packets.

Considering a sequence of packet pairs, where the two packets in pair i arrive at a hop at times $\tau i_1$ and $\tau i_2$ and depart (i.e. arrive at the next hop) at times $\tau i^*_1$ and $\tau i^*_2$. We are not interested in the absolute arrival times, but rather the inter arrival times of the packets in pair i:

$$t_i = \tau_{i2} - \tau_{i1}$$

$$t_i^* = \tau_{i2}^* - \tau_{i1}^*$$

The dimensionless quantity inter-packet strain $\epsilon_i$, as $$1 + \varepsilon_i = \frac{t_i^*}{t_i}$$

The strain can be expressed in terms of the delay variation as $$\varepsilon_i = \frac{\delta_i}{t_i},$$

where $\delta_i = t_i^* - t_i$.

The strain provides a direct analogy in the discrete description to the model ratio of demanded to received traffic rate discussed above. With packet size s, at the time resolution of inter-packet time separation level, demanded traffic rate is $u=s/t_i$ and for the received traffic rate $r=s/t^*i$, which gives $$\frac{u}{r} = \frac{s/t_i}{s/t_i^*} = \frac{t_i^*}{t_i} = 1 + \varepsilon_i$$

The deviation of u/r from unity is equivalent to the deviation of the strain $\epsilon$ from zero. No strain means no congestion.

The asymptotic behavior is a sloping straight line, which is the main point of interest here. The deviation from this straight line is taken care of by a noise term in our approach.

$$\varepsilon = v + \begin{cases} 0 & (u < B) \\ \alpha(u-B) & '(u-\beta)(u \geq B) \end{cases} \quad (1)$$

in the model of Equation 1, $\alpha$ is a state variable equal to $1/C$, $\beta$ is a state variable equal to $(S/C)-1$, and v is measurement noise.

Input data for an adapted estimation algorithm, e.g. BART, etc, is generated by sending sequences of N probe packet trains with the same internal traffic rate u.

In the model, observation of the inter-packet strain over the path gives a handle on estimating the available bandwidth for the tight link, and consequently the available bandwidth of the entire path. It is assumed, that for the average inter-packet strain of consecutive probe packet pairs is a sequence of a given rate u, any systematic deviation from zero is dominated by the effect of cross traffic interaction in the FIFO queue at the bottleneck link.

Comparing two probe traffic intensities $u_1$ and $u_2$, wherein $u_1 > u_2$ and $u_1$ is higher than the available bandwidth B, a hop with the available bandwidth B will cause an inter-packet strain $\epsilon_1$ on a probe packet train passing said hop. A probe packet train having traffic intensities $u_2$, which is less than the available bandwidth B, the inter-packet strain $\epsilon = 0$, i.e. the hop will not add any time dispersion to the probe train.

The available bandwidth is related to the state variables as $$B = -\frac{\beta}{\alpha}$$

Thus, an estimate of the available bandwidth can be readily obtained if the state variables $\alpha$ and $\beta$ can be estimated.

In a filter-based approach, the state of a system is estimated from repeated measurements of some quantity dependent on the system state, given models of how the system state evolves from one measurement occasion to the next, and how the measured quantity depends on the system noise and the measurement noise, respectively. The system equations are then $$x_k = f(x_{k-1}) + w_{k-1}$$

$$z_k = h(x_k) + v_k \quad (2)$$

Where x is the state of the system, z is the measurement, w is the process noise and v is the measurement noise. The functions f and h represent the system evolution model and the measurement model, respectively. The subscript refers to the "discrete time".

A Kalman filter is an optimal filter to use if the functions f and h are linear, and if both the process noise and the measurement noise are Gaussian and uncorrelated.

In the linear case, the system can be expressed using matrices as follows:

$$x_k = Ax_{k-1} + w_{k-1}$$

$$z_k = Hx_k + v_k \quad (3)$$

The Kalman filter equations allowing calculation of the new estimate from the previous estimate and the new measurement are:

$$\hat{x}_k = \hat{x}_k^- K_k(z_k - H\hat{x}_k^-)$$

$$P_k = (I - K_k H) P_k^- \quad (4)$$

where $$\hat{x}_k^- = A\hat{x}_{k-1} \quad (5)$$

$$P_k^- = AP_{k-1}A^T + Q$$

$$K_k = P_k^- H^T (HP_k^- H^T + R)^{-1} \quad (6)$$

Kalman filtering can be understood as a process where there are two phases of calculation in each iteration. First, there is a "prediction" phase, where the previous estimate evolves one discrete time step (Equation 5) according to the system model. Then, there is a "correction" phase, where the new measurement is taken into account (Equation 4). The updated error covariance matrix $P_k$ of the state estimate is also computed.

As can be seen from Equations 5 and 6, the Kalman gain $K_k$ increases with Q and decreases with R. These Kalman filter inputs Q and R are covariances of the process noise w and measurement noise v, respectively. These quantities may be intuitively understood as follows. Large variations of the noise in the system model, i.e. high Q, mean that the prediction according to the system model is likely to be less accurate, and the new measurement should be more heavily weighted. Large variations in the measurement noise, i.e. high R, mean that the new is likely to be less accurate, and the prediction should be more heavily weighted. Note that the measured quantity z=E is a scalar, and R is also a scalar (or a 1×1 matrix).

Exemplary embodiments make use of a Kalman filter in order to produce an updated estimate of the available bandwidth over a network path for each new measurement. Each measurement includes sending a sequence of pairs of time—stamped packets, and calculating the average inter-packet strain. In some embodiments, the sequence of packet pairs may coalesced into a train. The variance of the inter-packet strain is also computed to produce the R input for the Kalman filter equations. In some embodiments, the probing rate u is chosen randomly for each measurement, for example, according to a probability distribution such as a uniform distribution. In some embodiments, measurements are repeated after a time interval chosen randomly for each new measurement from a probability distribution, for example, a one—point distribution, where the interval one second is chosen with probability one.

It should be noted that the Kalman filter method is very "forgiving", and good results are often produced even when the ideal conditions are slightly broken. So, even if a system displays characteristics that deviate somewhat from this piecewise linear system curve, the resulting available bandwidth estimate is not automatically invalidated. Of course, all variables in this model are dynamical, i.e. may vary in time, so they depend on the subscript (which is sometimes suppressed in this exposition).

The model of Equation 1 is not linear, but it is piecewise linear. Although Kalman filters are not normally applicable in such cases, this problem is circumvented according to exemplary embodiments, and efficient convergence can be obtained. Even if the piecewise linear model used is only an approximation, the Kalman filter can still produce good estimates, as the noise terms can accommodate some errors due to "miss-modeling". The model of Equation 1 allows for application of a Kalman filter, when the state of the system is represented by a vector containing the two parameters of the sloping straight line part of Equation 1.

$$x = \begin{bmatrix} \alpha \\ \beta \end{bmatrix} \quad (7)$$

In order to fulfill the linearity criterion for applicability of Kalman filtering, some embodiments of the invention track u with respect to B, and attempt to stay on the sloping line part of Equation 1. Since the true value of B, the available bandwidth, is not known, the most recent estimate $\hat{B}$, or some appropriate threshold value in the vicinity of $\hat{B}$. If u is smaller than this threshold, the measurement is disregarded and the estimate of the state vector is not updated. The measurement $\epsilon_k$ of the strain at discrete time k can be written as $$\epsilon_k = Hx_k + v_k \quad (8)$$

Where H=[u 1]. Also, the evolution of the system state can be written as $$x_k = x_{k-1} + w_{k-1} \quad (9)$$

Thus, the Kalman filter formalism may be applied to the state vector of Equation 7, with A=I and z=$\epsilon$, where I is the Identity matrix.

The state vector x of Equation 7 is two-dimensional, so the covariance Q of the process noise w is a 2×2 matrix. This Q matrix may be used for performance tuning, given a reference network with controlled and known traffic and thus known state vector of Equation 7, the Kalman equations become computationally very simple, and only a few floating—point operations are needed at each iteration. When the filter estimates the system state variables $\alpha$ and $\beta$, the estimate $\hat{B}$ of the available bandwidth B is easily calculated from the estimates $\hat{\alpha}$ and $\hat{\beta}$, as $$\hat{B} = -\frac{\hat{\beta}}{\hat{\alpha}}$$

As illustrated in FIG. 2, the method may use a sender unit and a receiver unit. The sender unit sends probe packet trains comprising inner data packets and outer data packets to the receiver with a fixed time dispersion between the first and the last packet, corresponding to a specific probe rate. This is repeated for varying probe rates. If the probe rate of the train is higher than the available bandwidth at some link in the path, the time dispersion at the receiver side will be larger than the time dispersion at the sender side.

Said methods give an estimate of e.g. the available bandwidth for a data traffic path between a sender and a receiver.

One problem with the existing active measurement methods is the time it takes to achieve and present the bandwidth estimate. Further one problem is that the measured bandwidth estimate can give a higher capacity value than the capacity actual available. Even with a Kalman filter the estimated bandwidth is showing bigger bandwidth than available, creating uncertainness to the measurements. This problem is discussed in ref. [1].

However, an unexpected technical effect in improving the time for an estimation of the analyzed property or quantity in question and the accuracy of the estimation have been achieved by using a limitation or a special known value for one of the properties used in the one or more initial values used in the estimation algorithms.

As an example, the prior art document U.S. Pat. No. 7,778,179 B2 describes the employment of the BART method, wherein a Kalman filter receives as inputs a Q matrix, and the initial estimates of the state vector $\hat{x}_0$ and an error covariance matrix $P_0$. Said initial estimates of the state vector $\hat{x}_0$ and the error covariance matrix $P_0$ are derived from past experience or experimentation. According to said prior art, the accuracy of the initial estimates is not a significant factor in the operation of the Kalman filter. Thus, said statement would lead a skilled person to try some other measures for improving the accuracy.

In the following description, improved methods for solving the stated problem are proposed both in one-way and two-way.

Figure 5:
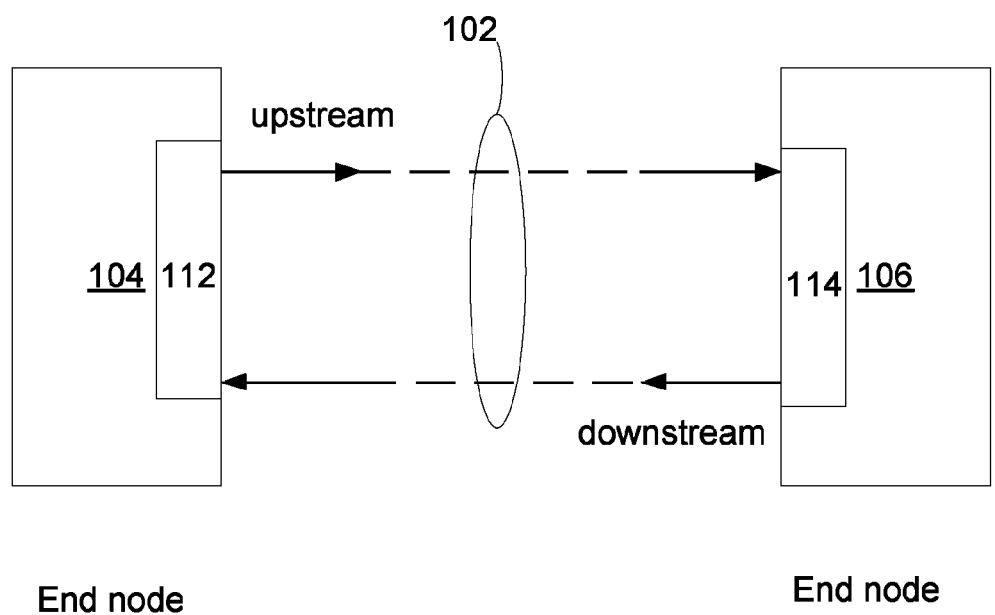
FIG. 5 is a block diagram schematically illustrating some basic features.

FIG. 5 is illustrating a data path 102 or data transmission path or data traffic path in a data communication network between two end nodes 104, 106. Data traffic, i.e. data packets according to one or more standard protocol (IP, TCP, etc. . . . ) is transferred in both directions.

Further, each end node has an interface 112, 114 with an upstream and downstream bandwidth capacity value. As illustrated in the figure, the upstream direction and the downstream direction is specified for the data path.

The value of the upstream bandwidth capacity $MBC_u$ may be the same as the value of the downstream bandwidth capacity $MBC_d$ for an interface of an end node. However, often the bandwidth values are pre-set to quiet different values, e.g. by an operator or due to a SLA agreement. It has been found that the lowest of said bandwidth values is resulting in the most accurate result. In e.g. many access networks the local bandwidth capacity is asymmetric. One reason for this is the physical transport has asymmetry. The second reason is that the Service Level Agreement (SLA) is sold with different capacity such as 100 Mbps downlink and 10 Mbps uplink.

How the bandwidth capacity values will be used in the evaluation of the available conditions of a data path will hopefully be clarified of the following description of the different embodiments.

Figure 6:
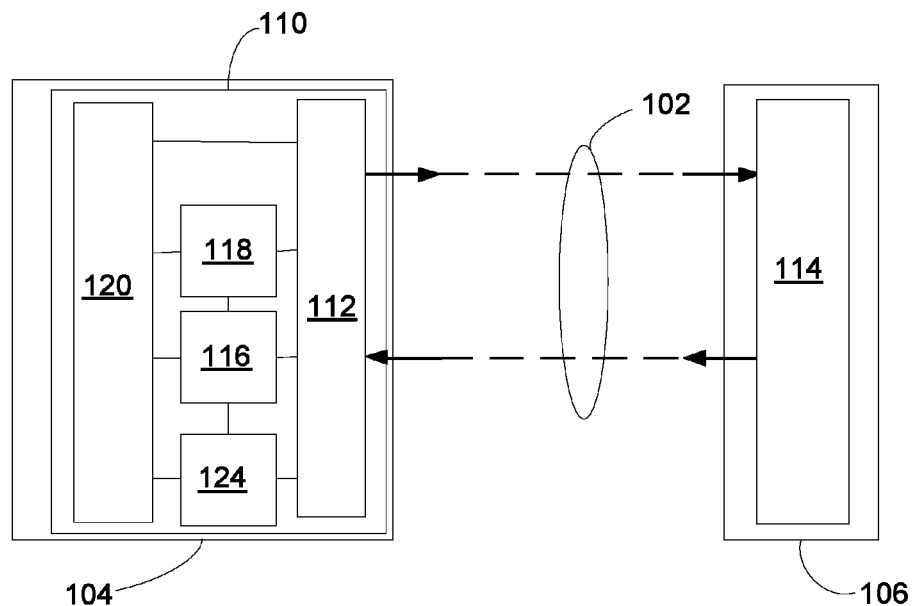
FIG. 6 is a block diagram illustrating a node arrangement for evaluating a data transfer path according to exemplary embodiments.

FIG. 6 is a schematic illustration of embodiments of a node arrangement 110 for evaluating available conditions, e.g. available bandwidth, of a data path between two end nodes 104, 106 in a data communications network by means of an active measurement process, e.g. BART, comprising one or more measurement sessions. In a measurement session one of the end nodes 104, 106 is sending probe packet sequences and the second node is a receiving said probe packet sequences. If a two-way measuring method is used, said nodes may act as both sending and destination nodes of probe packet sequences.

The probe packet sequence sending node comprises an interface 112 having one upstream maximum bandwidth capacity $MBC_u$ and one downstream maximum bandwidth capacity $MBC_d$. The probe packet sequence receiving node 106 comprises an interface 114 having one upstream maximum bandwidth capacity $mbc_u$ and one downstream maximum bandwidth capacity $mbc_d$.

The node arrangement 110 in end node 104, comprises measurement means 116 configured to perform a measurement session of said data path for determining a measurement result, e.g. delay, packet loss, etc.

Further, the arrangement 110 comprises an evaluating device 124 for estimating one or more available conditions, e.g. available bandwidth, of a data path using the measurement result and one or more initial parameter values as input in a calculation algorithm, e.g. by means of a Kalman filter. A more detailed description of the Kalman filter is presented in FIG. 10.

The arrangement 110 further comprises setting means 118 configured to set one initial parameter value for the calculation to a maximum bandwidth capacity based on the lowest bandwidth capacity value of the interface of the node sending said probe packet sequences during said measurement session, e.g. if interface 112 is the sending interface, either upstream maximum bandwidth capacity $MBC_u$ or downstream maximum bandwidth capacity $MBC_d$. In the case interface 114 is the sending interface, either upstream maximum bandwidth capacity $mbc_u$ or downstream maximum bandwidth capacity $mbc_d$.

According to further exemplary embodiments, OWAMP or TWAMP based methods are known for determining the forward and reverse available capacity, e.g. bandwidth, or tight link capacity of a data path.

The IETF IP Performance metrics (IPPM) working group have defined two IP active measurement protocols: One-Way Active Measurement Protocol (OWAMP) and Two-Way Active Measurement Protocol (TWAMP). OWAMP is designed for measuring one-way packet delay and one-way packet loss between two nodes in a data communication network.

TWAMP is based on OWAMP and designed for measuring one-way and two-way (round-trip) packet delay and packet-loss between two nodes.

Said methods involves transmitting from a source endpoint node toward a destination endpoint node a forward packet train comprising a first plurality of test packets over a forward data path, and receiving at the source endpoint node a corresponding reverse packet train from the destination node. The reverse packet train comprises a second plurality of test packets or probe packets over the reverse data path each of which correspond to a respective one of the first plurality of IP test packets. The maximum bandwidth capacity of the sending interface may be transferred to the node where the evaluating means are situated by a TWAMP control message comprising BART extensions, i.e. padding octets to transfer additional information. TWAMP protocols are described in more detail in standard documents, e.g. RFC 5357 and RFC 6038. Extended TWAMP protocols for providing additional information elements to enable various aspects of forward and reverse data path testing are known from International Patent Application No. WO 2012066371 A1.

Said upstream maximum bandwidth capacity values and downstream maximum bandwidth capacity values may have to be sent from one end node to the other where the evaluation device 118 is located. Different embodiments for transferring said capacity values will be presented hereafter.

The node arrangement may also comprise a controller 120, which may be implemented as a digital processor, for controlling the components in the node arrangement.

Figure 7:
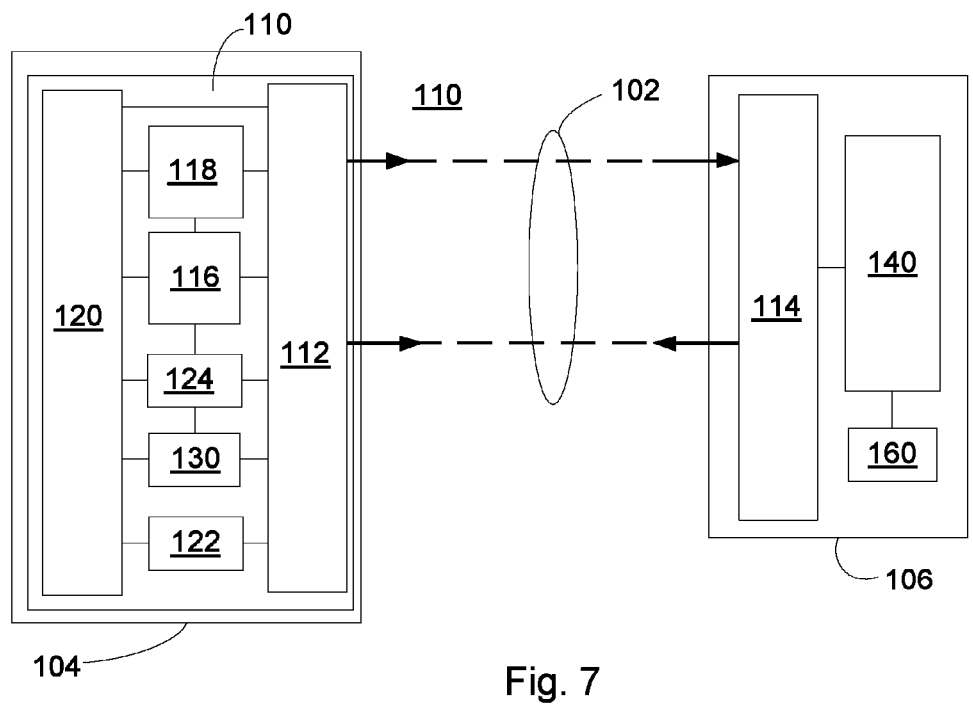
FIG. 7 is a block diagram illustrating a node arrangement for evaluating a data transfer path according to further exemplary embodiments.

FIG. 7 illustrates an exemplary embodiment of the node arrangement, which besides the same components as in the arrangement in FIG. 6 comprises further components. One of the end nodes 106 is a reflector node, comprising a session reflector 140, and the other node 104 comprises the evaluating device 118, which needs the upstream maximum bandwidth capacity and the downstream maximum bandwidth capacity of the interface 114 in the reflector node to be able to calculate the requested condition. The reflector node is therefore equipped with a session sender 160 configured to send a protocol, e.g. an OWAMP protocol message if the measurement session is based on OWAMP, or a TWAMP protocol if the measurement session is based on TWAMP. The node arrangement 110 preferably comprises the same functionality to be able to send said protocols.

In an exemplary embodiment of the node arrangement 110, the node arrangement comprises a receiving means 122 configured to acquire the upstream and downstream maximum bandwidth capacity of the interface from a memory storage 130 in the end node or end nodes, wherein it has been pre-stored. If the above arrangement is used in a mobile telecommunication system network, said memory storage may be located in a Radio Base station, Node B, eNB or the like depending on the kind of radio access system that is used.

The node arrangement 110 therefor comprises a receiving means 122 configured to receive the upstream maximum bandwidth capacity and the downstream maximum bandwidth capacity of the sending interface of the reflector node, either in an OWAMP protocol message or a TWAMP protocol message.

The TWAMP protocol is therefore extended to provide various additional information elements to enable various aspects of forward and reverse path IP path testing and which, among other things, specify what information is embedded in each test packet padding octet.

The implementation of communicating the maximum capacity parameter can be done in different ways, this is implementations issue.

The Valued-Added Octets feature may be immediately placed after the TWAMP header or immediately after any new field that could be added to the TWAMP header or added to the beginning of the padding octets in the future. Therefore the placement of the first bit from the valued-added octets depends on the mode(s) being selected.

Figure 8:
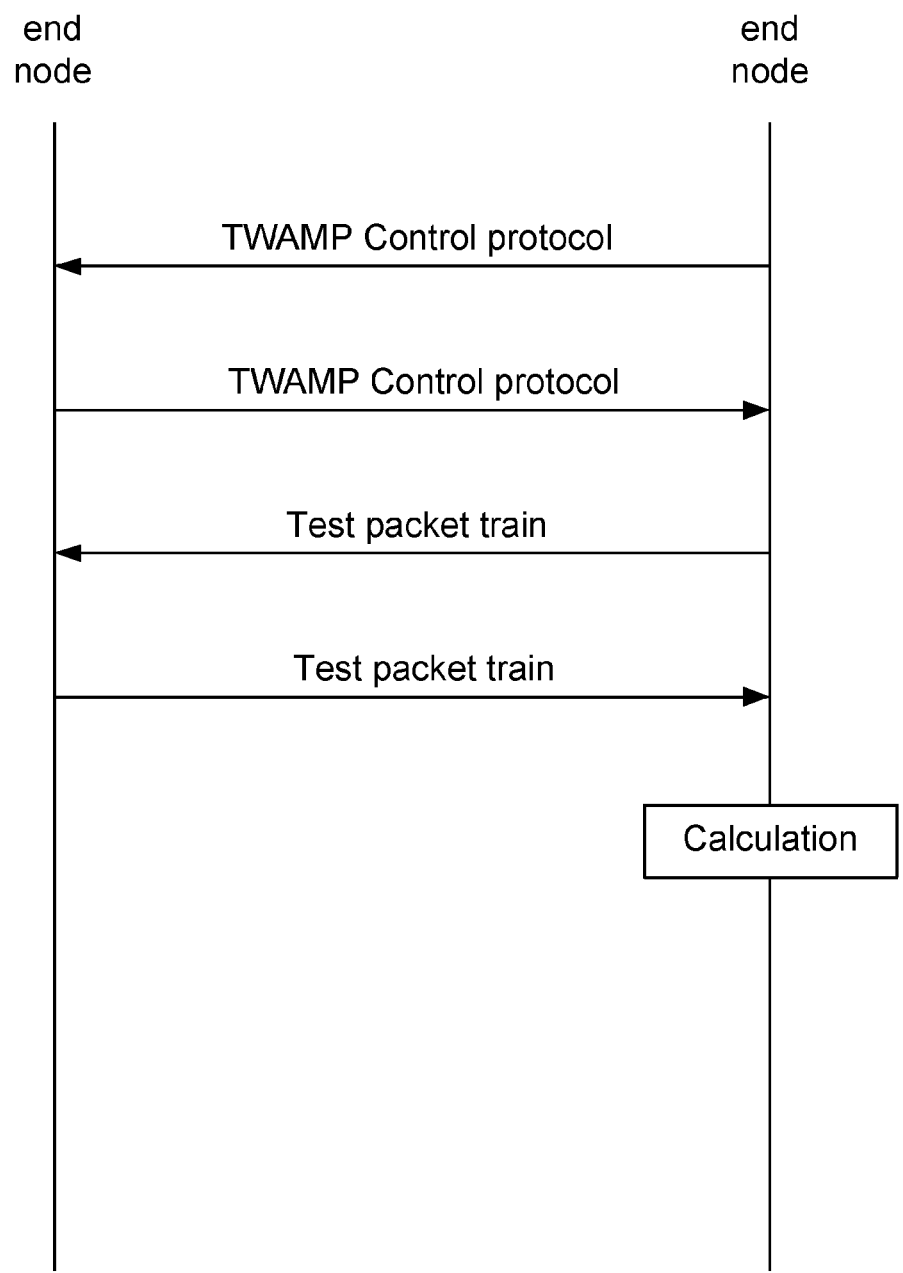
FIG. 8 is a message scheme illustrating an embodiment of a TWAMP/BART method.

FIG. 8 is a message scheme illustrating an embodiment of a TWAMP method. The TWAMP measurement architecture is usually comprised for only two hosts with specific roles. This is known as the two-host implementation. One host in one of the end nodes plays the role of the control-client and session-sender and the other host in the other end node plays the role of the server and the session-reflector. The host the initiates the TWAMP control TCP connection takes the roles of the control-client and session sender. The host that acknowledges the TWAMP control TCP connection accepts the roles of the session and session-reflector. In real-life work, each host may participate in several active sessions at the same time, both as control-client/session sender and server/session-reflector.

The control-client/session sender sends a TWAMP control protocol to the server/session-reflector, which acknowledges and returns a TWAMP control protocol comprising the maximum bandwidth capacity of its node interface, e.g. as a padding octet extension. Then the transmission of forward packet trains comprising a first plurality of test packets over a forward data path, and reception of corresponding reverse packet trains from the destination node takes place. The control-client/session sender host/node calculates by means of the received measurements a calculation of the available conditions of a data path in both directions.

The above described node arrangement 110 may be implemented in digital electronically circuitry, or in computer hardware, firmware, software, or in combinations of them. Means and devices may be implemented in a computer program product tangibly embodied in a machine readable storage device for execution by a programmable processor; and method steps in the methods described here below may be performed by a programmable processor executing a program of instructions to perform functions of the embodiments of the methods and node arrangement by operating on input data and generating output.

The described methods and node arrangement may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such internal hard disks and removable disks; magneto-optical disks; and CD-ROM disks. Any of the foregoing may be supplemented by, or incorporated in, specially—designed ASICs (Application Specific Integrated Circuits).

The above described node arrangement embodiments support the following methods, which now will be described.

Figure 9:
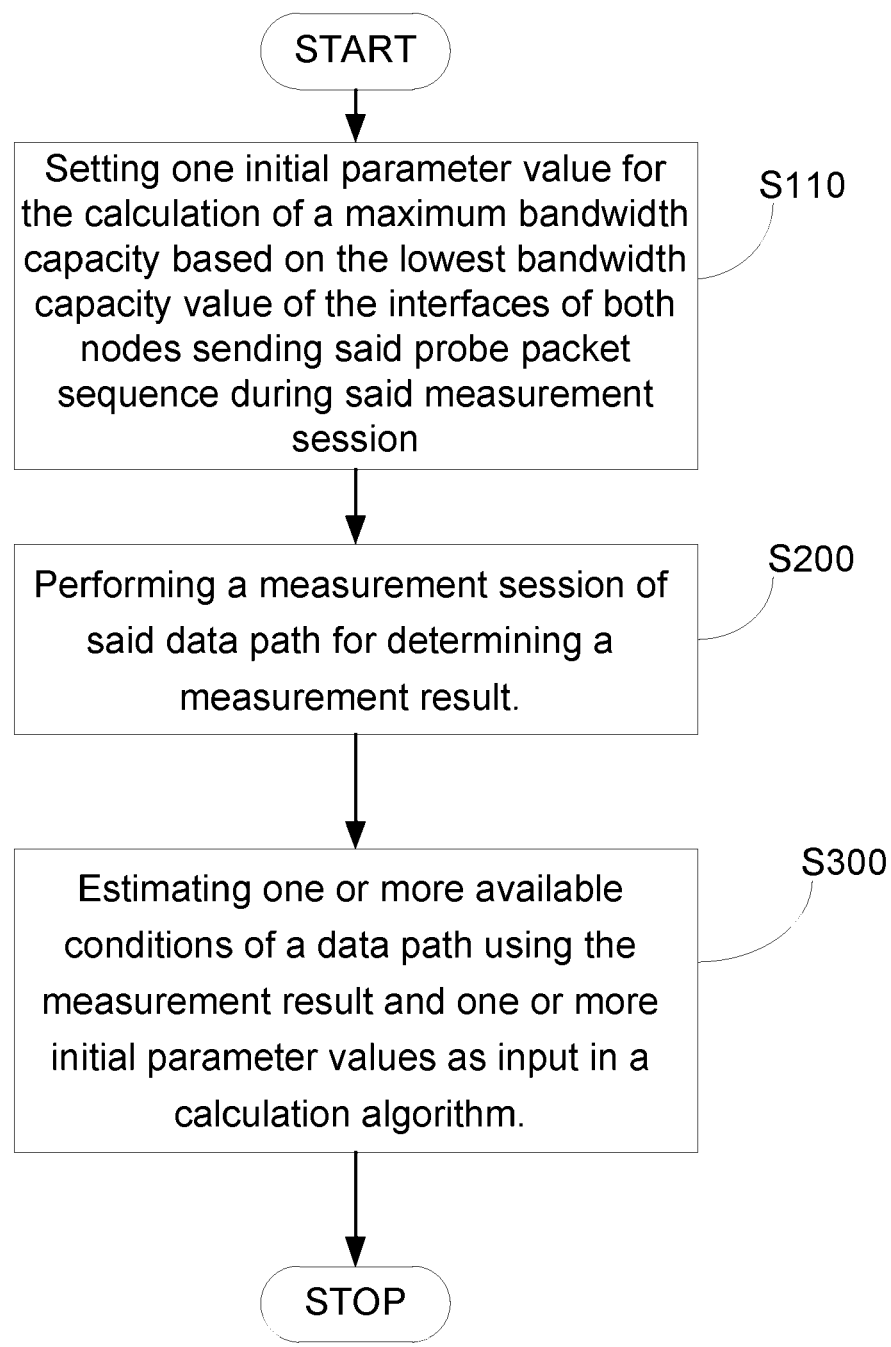
FIG. 9 is a flowchart of an embodiment of a method for estimating available conditions.

FIG. 9 is a flowchart of an embodiment of a method for evaluating available conditions of a data path between a sending node and a destination node in. An active measurement process comprising one or more measurement sessions is used. A method for evaluating available conditions of a data path between two end nodes in a data communications network by means of an active measurement process comprising one or more measurement sessions, in a session one of the end nodes is sending probe packet sequences and the other node is receiving said probe packet sequences, the probe packet sending node comprises an interface having one upstream maximum bandwidth capacity and one downstream maximum bandwidth capacity, the method comprising:

S200: Performing a measurement session of said data path for determining a measurement result.

S300: Estimating one or more available conditions of a data path using the measurement result and one or more initial parameter values as input in a calculation algorithm.

The method further comprises:

S110: Setting one initial parameter value for the calculation to a maximum bandwidth capacity based on the lowest bandwidth capacity value of the interfaces of both nodes sending said probe packet sequences during said measurement session.

According to further embodiments, the method may comprise,

Receiving the upstream maximum bandwidth capacity and the downstream maximum bandwidth capacity of the interface of the reflector node in an OWAMP protocol message (S105). If the measurement session is based on OWAMP, and one of the end nodes is a reflector node comprises an interface having one upstream maximum bandwidth capacity and one downstream maximum bandwidth capacity, said values has to be sent to the other node comprising the evaluating device:

According to another embodiment, the method may comprise:

Receiving the upstream maximum bandwidth capacity and the downstream maximum bandwidth capacity the interface of the reflector node in a TWAMP protocol message (S105). If the measurement session is based on TWAMP, and one of the end nodes is a reflector node comprises an interface having one upstream maximum bandwidth capacity and one downstream maximum bandwidth capacity, said values has to be sent to the other node comprising the evaluating device. Said upstream and downstream maximum bandwidth capacity of said interface may be received in an optional extension of a TWAMP protocol message.

In an alternative embodiment of the method, the upstream and downstream maximum bandwidth capacity of the interface of the node sending probe packet sequences may be acquired from a memory storage in the node. Said memory storage may be located in a Radio Base station.

As mentioned above, the upstream and downstream maximum bandwidth capacity of the interface of the node sending probe packet sequences is the capacity for the sending interface set by a Service Level Agreement (SLA).

Figure 10:
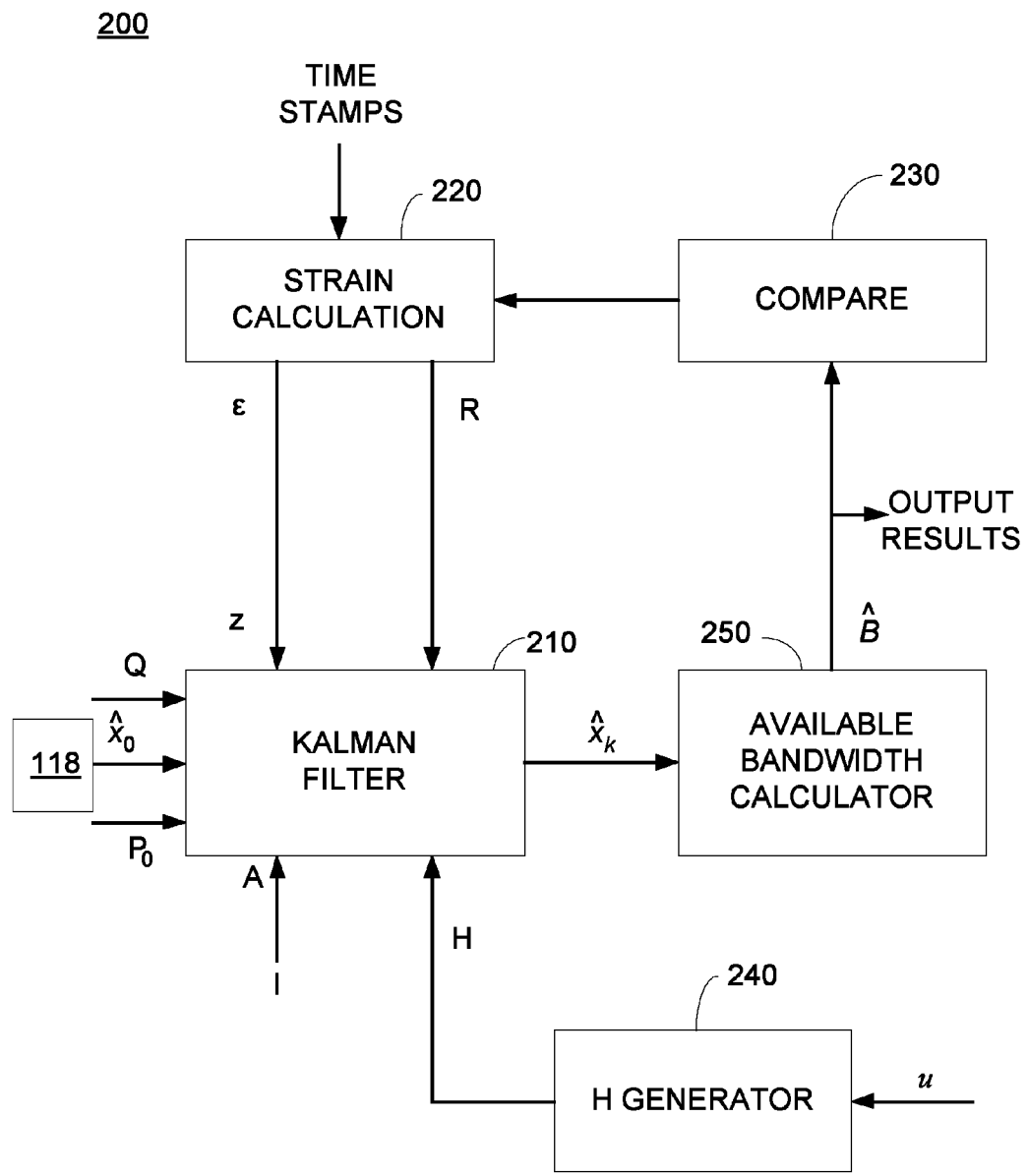
FIG. 10 is a block diagram schematically illustrating an embodiment of an apparatus comprising a Kalman filter.

FIG. 10 schematically illustrates an embodiment of an apparatus 200 comprising a Kalman filter 210 for evaluating data path conditions of a data path in which any embodiment of the above described method could be implemented.

As mentioned above, the sending node sends sequences of probe packet trains through the data (transfer) path to the receiving node. The time stamps in the probe packets made by the sending and receiving nodes are used in the evaluation. The receiving node may comprise an extraction unit for extracting the time stamp information and the probe packet rate$_u$ from the received probe packets. A strain calculation unit 220 calculates the inter-packet strain value of each pair of probe packets in the received sequence, and also calculates the average and variance of the inter-packet strain values.

The strain calculation unit 220 provides the average inter-packet strains as the z input to a Kalman filter 210, and also provides the inter-packet strain variance R as an input to the Kalman filter. The Kalman filter 210 also receives as inputs the Q matrix, and the initial parameter values or estimates of the state vector $\hat{x}_0$ and the error covariance matrix $P_0$. In some embodiments, the initial estimates of the state vector $\hat{x}_0$ and the error covariance matrix $P_0$ are derived from past experience or experimentation. However, according the present embodiments, one initial parameter value of the state vector $\hat{x}_0$ is set to a maximum bandwidth capacity based on the lowest bandwidth capacity value of the interfaces of both nodes sending said probe packet sequences during said measurement session by the setting means 118, see FIG. 6.

The Kalman filter 210 receives the identity matrix I as it's A matrix input, and also receives the matrix H (e.g. H=[1 u]) from a matrix generator 240 that produces matrix H in response to the probe packet rate u as extracted from the probe packets, e.g. by an extraction unit in the receiving node. In response to its inputs, the Kalman filter produces the updated state vector estimate $\hat{x}_k$. An available bandwidth calculation unit 250 uses the updated state vector estimate to update the available bandwidth estimate $\hat{B}$. The available bandwidth estimate $\hat{B}$ is provided as an output result from the evaluation arrangement, and is also provided to a compare unit 230 that compares the probe packet rate u to a threshold value that is equal to or suitably near $\hat{B}$. Depending on the result of this comparison, the compare unit 230 provides to the strain calculation unit an indication of whether or not the strain calculation unit should make its calculations for the current sequence of probe packet pairs. In some embodiments, the indication is provided to the Kalman filter, to signal whether or not the filter should be applied to the result of the strain calculation unit.

The extraction unit and the strain calculation unit can be considered as components of a data production unit that ultimately produces estimation data for use in estimating the available bandwidth. Also, the Kalman filter and the available bandwidth estimator can be seen as components of an estimation unit that applies Kalman filtering to the estimation data in order to produce the estimate of the available bandwidth.

Some embodiments are tunable to optimize the tracking performance at a desired available bandwidth-averaging time scale tau. For example, if tau=10 seconds, then the available bandwidth measurements are made over a 10-second time scale. In some embodiments, tau=10 seconds, and the 2×2 matrix Q has values of $Q11=10^{-5}$, $Q12=0$, $Q21=0$, and $Q22=10^{-3}$. In embodiments with shorter time scales, the value of Q22 may be increased, while maintaining Q11, Q12 and Q21 the same.

Some embodiments use scaling in the numerical calculations, so that the quantities involved are dimensionless. For example, $\epsilon$, $\beta$, v and R are all dimensionless. In order to make all other quantities dimensionless, the probe traffic rate u is scaled by the maximum capacity of the first hop from the probe sender host/node. This means that u=1 is the maximum possible probing rate, and that $\alpha$, x, w and Q are dimensionless.

In some embodiments, the components of the evaluating apparatus in FIG. 10 are provided externally of and separate from the receiving node, but are coupled to the extraction unit to receive therefrom the time stamp information and probe packet rate u. In this portioning example, all of the components are provided externally of and separate from the receiving node, in one or more other nodes of the network.

The evaluating apparatus can produce an updated estimate of the available bandwidth for each new sampling of the system, i.e. for each new train of probe packets pairs. The trains may be sent arbitrarily often (i.e. the time scale for the sampling measurement can be reduced arbitrarily), so the available bandwidth may be tracked in real time.

Data processing and memory requirements for performing the above-described filtering calculations can be met relatively easily. For example, in some embodiments the receiving node is a microprocessor platform. The update of the available bandwidth estimate using the Kalman filter equations reduces to performing only a few floating-point operations (closer to 10 than 100 in some embodiments). There is no need to save historical data, because only the previous state vector estimate and the new measurement are needed to calculate the updated state vector estimate.

Figure 11:
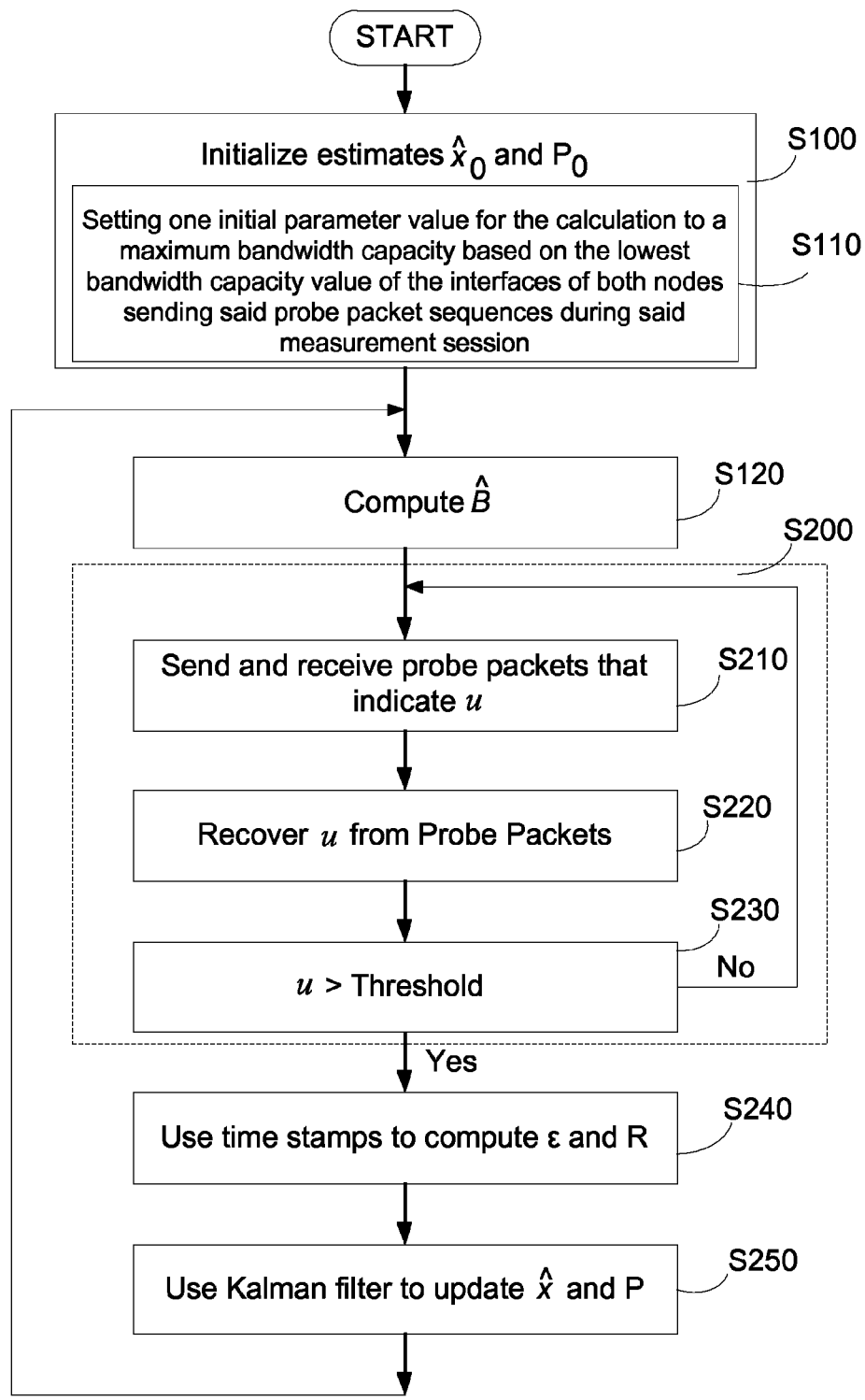
FIG. 11 is a flow chart illustrating an embodiment of a BART method.

FIG. 11 is a flow chart illustrating an embodiment of a BART method.

The BART algorithm proceeds as follows:

S100: The sender node makes an initial estimate of the state vector $\hat{x}_0$, wherein one initial parameter value of the state vector $\hat{x}_0$ is set to the maximum bandwidth capacity as described in FIG. 9, and an initial estimate $P_0$ of the error covariance matrix corresponding to $\hat{x}_0$. This step may therefore involve step S110 as described in FIG. 9. From $\hat{x}_0$, an estimates $\hat{B}$ of the available bandwidth is computed, as shown at S120.

S200 may comprise the following:

S210: The sender node sends a sequence (or train) of N probe packet pairs with probe traffic intensity u, according to a desired probability distribution (In some embodiments, the probability distribution for u is chosen based on past experience or experimentation). The N probe packet pairs are used for inter-packet strain measurement. Some embodiments send a sequence of N+1 probe packets that are used to form N pairs of probe packets. That is, the second probe packet of the first pair is also used as the first probe packet of the second pair, and so on. In some embodiments, probe packets are not shared among the probe packet pairs, so a sequence of 2 N probe packets is used to form N distinct pairs of probe packets. The sender passes the current value of the probe packet traffic rate u to the receiver in the probe packets.

S220: For the received sequence of probe packets, the receiver recovers the traffic intensity u from the probe packets.

S230: u>threshold value? If u exceeds a threshold value (for example, $\hat{B}$ or a value suitably chosen in the vicinity of B) in S220, then the receiver uses the time stamps of the probe packets to compute the average $\epsilon$ of the N inter-packet strain values corresponding to the N pairs of packets, as shown S240. The receiver also computes the covariance R. If u is less than or equal to the threshold value, then the time-stamps of the probe packets are ignored, no update is performed, and operations return to operation S210 above, as shown at S210.

S250: The Kalman filter uses the average inter-packet strain value and covariance matrix (if any) from operation above to update the estimates of the state vector $\hat{x}$ and error covariance matrix P. Operations return to operation 120 above, wherein the new state vector estimate, a new estimate $\hat{B}$ of the available bandwidth is computed, as shown at S120 and the next sequence of probe packets is generated, as shown at S210.

Figure 12:
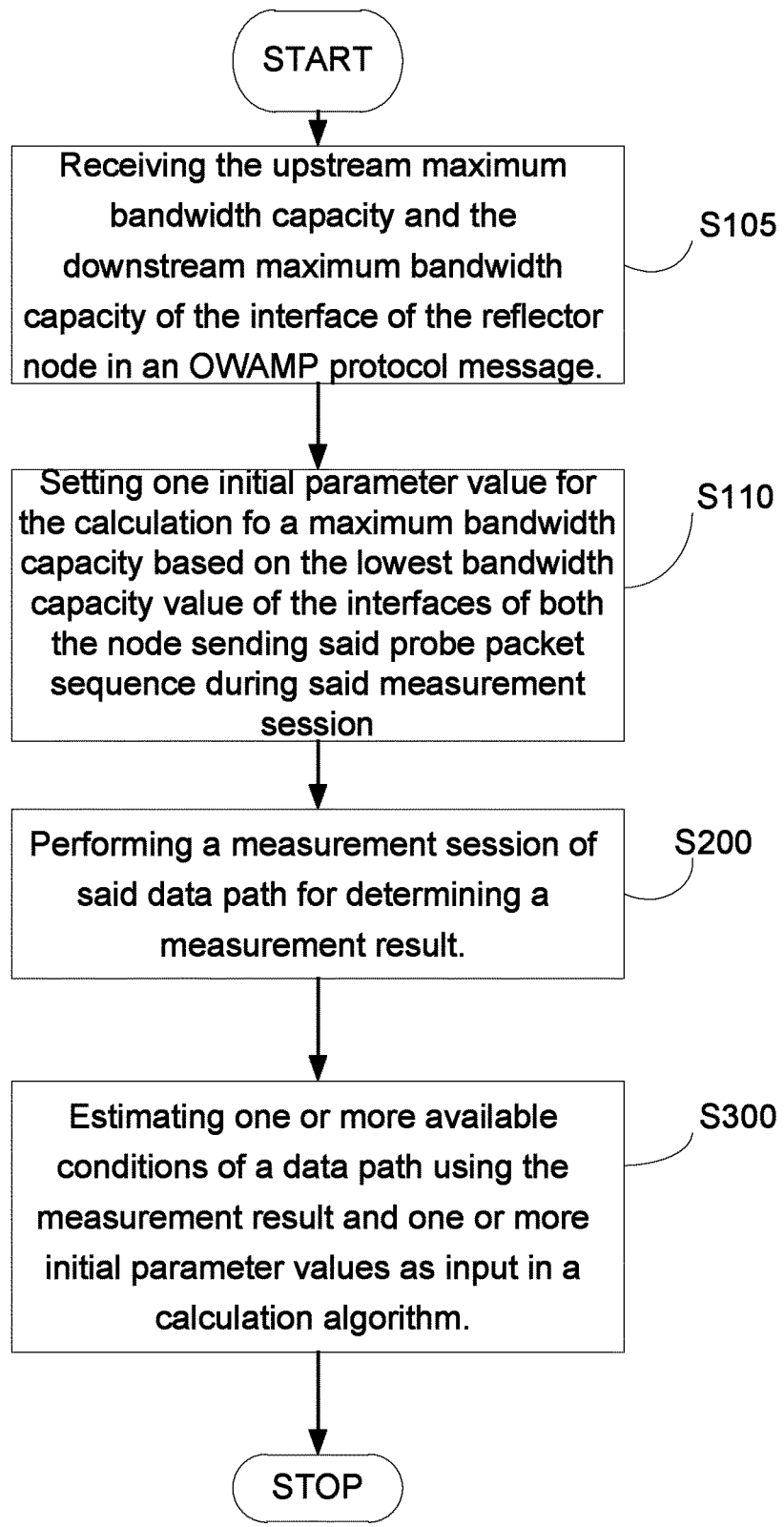
FIG. 12 is a flowchart of an embodiment of a TWAMP/BART method.

FIG. 12 is a flowchart of an embodiment of a TWAMP/BART method. FIG. 12 is a flowchart of an embodiment of a method for evaluating available conditions of a data path between a sending node and a destination node. An active measurement process comprising one or more measurement sessions is used. The data path comprises a sending node interface which in this case is the server/session-reflector node interface, e.g. the link illustrated as $P(R_{N-1}, R_N)$ as illustrated in FIG. 1. The method comprises:

S200: Performing a measurement session of said data path for determining a measurement result.

S300: Estimating one or more available conditions of a data path using the measurement result and one or more initial parameter values as input in a calculation algorithm.

S105: Receiving the upstream maximum bandwidth capacity and the downstream maximum bandwidth capacity of the interface of the reflector node in an OWAMP protocol message. In alternative embodiments the upstream maximum bandwidth capacity and the downstream maximum bandwidth capacity of the interface of the reflector node a TWAMP protocol message or an optional extension of a TWAMP protocol message instead of a OWAMP protocol message.

S110: Setting one initial parameter value for the calculation to a maximum bandwidth capacity based on the lowest bandwidth capacity value of the interfaces of both nodes sending said probe packet sequences during said measurement session.

Figure 13:
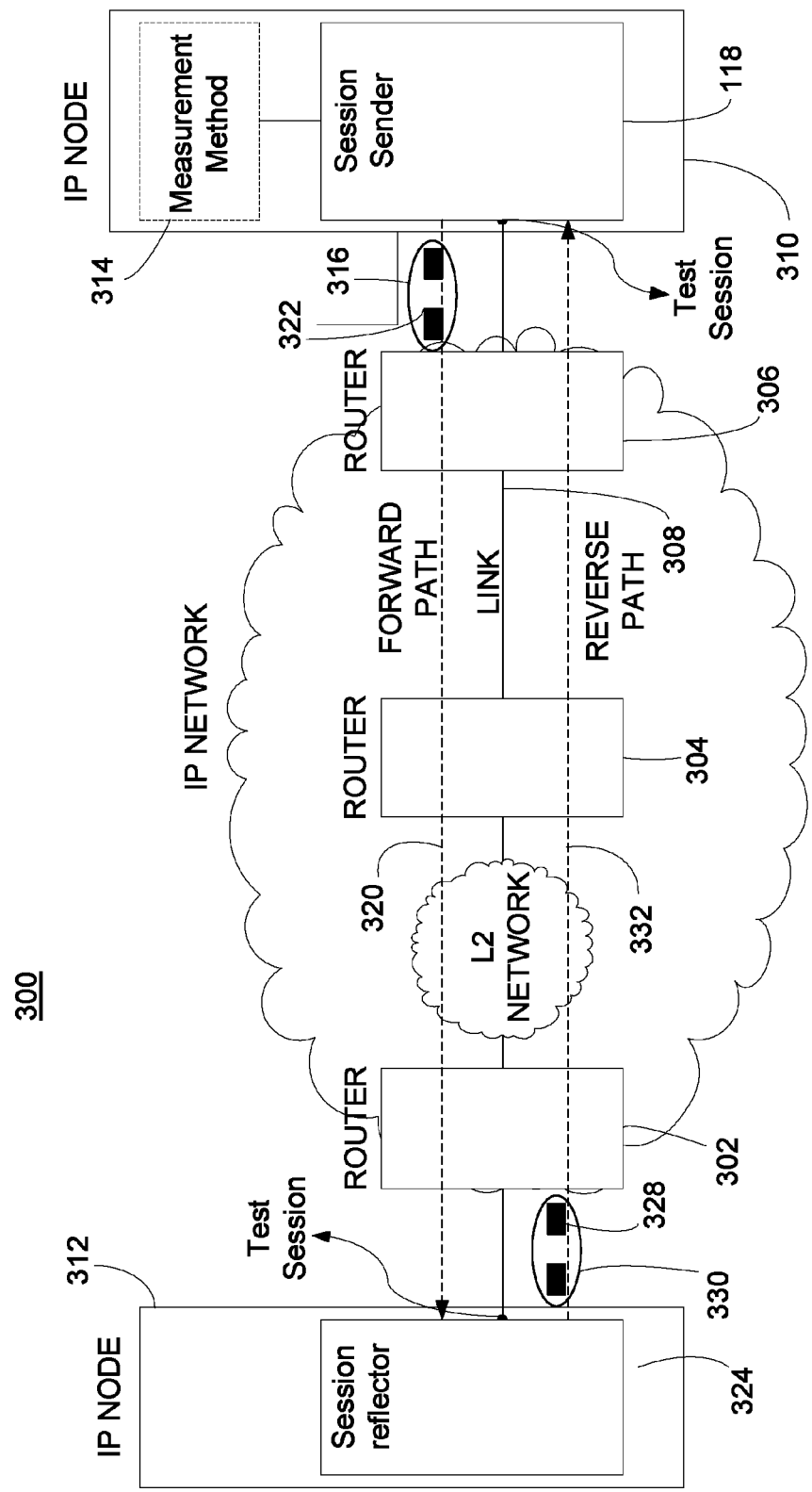
FIG. 13 is a block diagram illustrating an exemplary IP network wherein embodiments of the TWAMP/BART method may be implemented.

FIG. 13 illustrates an exemplary IP network 300 in which available path capacity and tight link capacity can be tested. Therein, the IP network (e.g., an IPv4 or IPv6 network) 300 includes, for example, a number of routers 302, 304 and 306 which are connected to one another by wireline or wireless connections (IP hops) to collectively form a forward path 320 and a reverse path 332 between two endpoint IP nodes 310 and 312. A link 308 in the forward path 320 or reverse path 332 can include one or more of an Ethernet wire, an Ethernet connection over a Metro Ethernet network, a wireless connection or any other link-layer media.

According to this exemplary embodiment, endpoint node 310 can, for example, be an IP/UDP node running an active measurement protocol with an available path capacity measurement method or application 314 which is capable of measuring the available bandwidth capacity and/or tight link capacity of the forward path 320 and reverse path 332 in a non-intrusive manner. Specific details of this protocol and corresponding measurement activities are described in more detail below. The IP nodes 310, 312 can be, for example, a host, router, test equipment or any other platform running an IP stack.

To perform an available IP path capacity test or tight IP link capacity test according to exemplary embodiments, a forward packet train 316 is generated by a Session Sender function 318 running on node 310, and transmitted in a forward path direction 320. FIG. 13 illustrates a single forward packet train 316 including two Session Sender IP test packets 322, however it will be appreciated by those skilled in the art that more than two IP test packets can be included in a forward packet train according to exemplary embodiments.

The forward packet train 316 is received by the other endpoint 312's Session Reflector function 324. The Session Reflector function 324 buffers the test IP packets which it receives in buffer 326, and then uses those buffered packets to generate corresponding Session Reflector test IP packets 328. The Session Reflector test IP packets 328 are transmitted back toward node 310 as part of a reverse packet train 330 transmitted in the reverse path direction denoted by dotted line 332. Again, as noted above, reverse packet train 130 can include more than two IP test packets.

Exit timestamps are provided in the IP test packets 322 and IP test packets 328 to indicate their time of transmission by the Session Sender function 318 and Session Reflector function 324, respectively. Similarly, arrival timestamps are inserted into (or otherwise associated with) the IP test packets 328 to indicate the time at which the corresponding IP test packets 322 in the forward packet train 316 arrived at the endpoint node 312, and into the IP test packets 328 to indicate the time at which the packets 328 arrive back at the endpoint node 310.

Using this information, various IP path capacity metrics, e.g., the available path capacity and tight link capacity, in the forward path direction 320 can be calculated by the APC measurement function 314 from the exit timestamps inserted in the test packets 322 by the Session-Sender function 318 and the arrival timestamps inserted or associated with the test packets 328 at the Session-Reflector function 324. Similarly, the available path capacity and tight link capacity in the reverse path direction 332 can be calculated by the APC measurement function 314 from the exit timestamps inserted in the reflected test packets 328 by the Session-Reflector and the arrival timestamps inserted or associated with the reflected test packets at the Session-Sender 318. Examples of IP path capacities which can be measured or determined in accordance with exemplary embodiments specifically include, but are not limited to, available path capacity (APC) and tight ink capacity (TLC), which are defined in the standards specifications document ITU Y.1450 Amendment 1, March 2009, the disclosure of which is incorporated here by reference. The specific algorithm(s) used by APC measurement function 314 to calculate specific IP path capacity parameters are beyond the scope of this discussion, since any desired technique can be employed. However a purely exemplary algorithm is described in the article entitled "Real-Time Measurement of End-to-End Bandwidth using Kalman Filtering", to Svante Ekelin et al., Network Operations and Management Symposium (NOMS), April 2006, 10th IEEE/IFIP, pp. 73-84, the disclosure of which is incorporated herein by reference.

It will be appreciated by those skilled in the art that the above-described, exemplary portion of an IP network 300, is purely illustrative and that other IP node configurations, IP link configurations, etc., can be used in conjunction with the protocols described above, and in more detail below. For example, the IP node 310 which controls the Session-Sender function 318, as well as the IP node 312 which controls the Session-Reflector function 324, can support multiple concurrent test sessions with different IP packet characteristics (e.g. DiffSery codepoint and packet size). Moreover, the APC measurement function 314 can run on the same IP endpoint node 310 as the Session-Sender function 318 or can run on a separate node or server.

It will be appreciated by the foregoing discussion that calculation of available capacity on a forward path 320 and reverse path 332 from a single endpoint according to exemplary embodiments is enabled by providing information associated with transmission and reception of a packet train on both the forward path 320 and reverse path 332. According to one exemplary embodiment, the TWAMP protocol is extended to provide various additional information elements to enable various aspects of forward and reverse path IP path testing and which, among other things, specify what information is embedded in each test packet padding octet.

The implementation of communicating the maximum capacity parameter can be done in different ways, this is implementations issue.

The Valued-Added Octets feature is immediately placed after the TWAMP header or immediately after any new field that could be added to the TWAMP header or added to the beginning of the padding octets in the future. Therefore the placement of the first bit from the valued-added octets depends on the mode(s) being selected.

A version number and a sequence of flag bits are defined at the beginning of the value-added padding octets. The version number identifies the version of the value-added padding octets and meaning of the flag bits and corresponding fields. Each flag bit indicates if specific field is used in the valued-added padding octets.

Moreover, exemplary embodiments also address how the Session-Sender function 318 and Session-Reflector function use the information provided in the specified IP test packet formats. For example, exemplary embodiments illustrate how a host is able to identify the incoming and outgoing packets that belong to a session, and have knowledge of each session and its associated state. Moreover, exemplary embodiments provide mechanisms for the Session-Sender function 318 to construct the various packet trains within a session, identify the desired reverse packet interval for each train and transmit each packet belonging to a train at a specific forward packet interval to the Session-Reflector function 324. Additionally, the Session-Reflector function 324 according to exemplary embodiments is provided with the capability to be able to identify the incoming packets that belong to a train within a session, store each incoming train and associated measurement data, and send back a corresponding new train at the desired reverse packet interval to the session-sender.

A number of embodiments have been described. It will be understood that various modifications may be made without departing from the scope. Therefore, other implementations are within the scope of the following claims.

REFERENCES

[1] Ekelin, S., Nilsson, M., Hartikainen, E., Johnsson, A., Mångs, J., Melander, B., Björkman, M.: Real-time measurement of end-to-end available bandwidth using kalman filtering. In: Proceedings to the IEEE/IFIP Network Operations and Management Symposium, Vancouver, Canada. (2006).
[2] Ribeiro, V., Riedi, R., Baraniuk, R., Navratil, J., Cottrel, L.: pathchirp: Efficient available bandwidth estimation for network paths. In: Passive and Active Measurement Workshop. (2003).
[3] Manish Jain and ConstantinosDovrolis, "Pathload: a measurement tool for end-to-end available bandwidth," in Passive and Active Measurement (PAM) Workshop 2002 Proceedings, Ft Collins, Co, USA, March 2002, pp. 14-25.
[4] Strauss, Katabi, and Kaashoek. A measurement study of available bandwidth estimation tools. In Proceedings of the ACM SIGCOMM Internet Measurement Workshop, Miami, USA, 2003.

The invention claimed is:

1. A method for evaluating available conditions of a data path between two end nodes in a data communications network by means of an active measurement process comprising one or more measurement sessions, wherein in a session one of the end nodes is sending probe packet sequences and the other node is receiving said probe packet sequences, and wherein the probe packet sending node comprises an interface having one upstream maximum bandwidth capacity and one downstream maximum bandwidth capacity, wherein the node sending probe packet sequences comprises computer instructions which when executed by a processor, cause the node sending probe packet sequences to perform the method comprising:
performing a measurement session of said data path for determining a measurement result;
receiving, from the node receiving said probe packet sequences, an upstream maximum bandwidth capacity and a downstream maximum bandwidth capacity of an interface of the node receiving said probe packet sequences;
estimating one or more available conditions of said data path using the measurement result and one or more initial parameter values as input in a calculation algorithm;
wherein one of the one or more initial parameter values for the calculation is set to the lowest maximum upstream and downstream bandwidth capacity value of the interfaces of both the node sending said probe packet sequences and the node receiving said probe packet sequences during said measurement session to represent a maximum bandwidth capacity of said data path.

2. The method according to claim 1, wherein the measurement session is based on OWAMP, and the node receiving said probe packet sequences is a reflector node, the method further comprising:
receiving the upstream maximum bandwidth capacity and the downstream maximum bandwidth capacity of the interface of the reflector node in an OWAMP protocol message.

3. The method according to claim 1, wherein the measurement session is based on TWAMP, and the node receiving said probe packet sequences is a reflector node, the method further comprising:
receiving the upstream maximum bandwidth capacity and the downstream maximum bandwidth capacity of the interface of the reflector node in a TWAMP protocol message.

4. The method according to claim 3, wherein the measurement session is based on TWAMP, and the method comprises:
receiving upstream and downstream maximum bandwidth capacity of the interface in an optional extension of a TWAMP protocol message.

5. The method according to claim 1, wherein the upstream and downstream maximum bandwidth capacity of the interface of the node sending probe packet sequences is acquired from a memory storage in the node sending probe packet sequences.

6. The method according to claim 1, wherein the upstream and downstream maximum bandwidth capacity of the interface of the node sending probe packet sequences is acquired from a memory storage in a Radio Base station.

7. The method according to claim 1, wherein the upstream and downstream maximum bandwidth capacity of the interface of the node sending probe packet sequences is the capacity for the interface set by a Service Level Agreement (SLA).

8. A node arrangement for evaluating available conditions of a data path between two end nodes in a data communications network by means of an active measurement process comprising one or more measurement sessions, wherein in a measurement session one of the end nodes is sending probe packet sequences and the other node is receiving said probe packet sequences, and wherein the probe packet sending node comprises an interface having one upstream maximum bandwidth capacity and one downstream maximum bandwidth capacity, the arrangement comprising:
a processor configure to perform a measurement session of said data path for determining a measurement result;
a receiver to receive, from the node receiving said probe packet sequences, an upstream maximum bandwidth capacity and a downstream maximum bandwidth capacity of the interface of the node receiving said probe packet sequences; and
an evaluating device for estimating one or more available conditions of said data path using the measurement result and one or more initial parameter values as input in a calculation algorithm;
wherein the processor is further configured to set one of the one or more initial parameter values for the calculation algorithm to the lowest maximum upstream and downstream bandwidth capacity value of the interfaces of both the node sending probe packet sequences and the node receiving said probe packet sequences during said measurement session to represent a maximum bandwidth capacity of said data path.

9. The node arrangement according to claim 8, wherein the measurement session is based on OWAMP, and the node receiving said probe packet sequences is a reflector node, the arrangement further comprising:
   a receiver configured to receive the upstream maximum bandwidth capacity and the downstream maximum bandwidth capacity of the interface of the reflector node in an OWAMP protocol message.

10. The node arrangement according to claim 8, wherein the measurement session is based on TWAMP, and the node receiving probe packet sequences is a reflector node, the arrangement further comprising:
   receiver configured to receive the upstream maximum bandwidth capacity and the downstream maximum bandwidth capacity the interface of the reflector node in a TWAMP protocol message.

11. The node arrangement according to claim 10, wherein the measurement session is based on TWAMP, and the receiver is configured to receive upstream and downstream maximum bandwidth capacity of the interface of the reflector node in an optional extension of a TWAMP protocol message.

12. The node arrangement according to claim 8, wherein the arrangement comprises a receiver configured to acquire the upstream and downstream maximum bandwidth capacity of the interface of the node sending probe packet sequences from a memory storage in the node sending probe packet sequences.

13. The node arrangement according to claim 8, wherein the arrangement comprises a receiver configured to acquire the upstream and downstream maximum bandwidth capacity of the interface of the node sending probe packet sequences from a memory storage in a Radio Base station.

14. The node arrangement according to claim 8, wherein the upstream and downstream maximum bandwidth capacity of the interface of the node sending probe packet sequences is the capacity for the sending interface set by a Service Level Agreement (SLA).

* * * * *